United States Patent
Fujii et al.

(10) Patent No.: US 11,542,566 B2
(45) Date of Patent: Jan. 3, 2023

(54) METHOD FOR DEPHOSPHORIZATION OF HOT METAL, AND REFINING AGENT

(71) Applicant: JFE Steel Corporation, Tokyo (JP)

(72) Inventors: Yusuke Fujii, Tokyo (JP); Yoshie Nakai, Tokyo (JP); Mikihiro Mori, Tokyo (JP); Takahiko Maeda, Tokyo (JP); Naoki Kikuchi, Tokyo (JP); Noritaka Nishiguchi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 195 days.

(21) Appl. No.: 16/473,876

(22) PCT Filed: Dec. 15, 2017

(86) PCT No.: PCT/JP2017/045197
§ 371 (c)(1),
(2) Date: Jun. 26, 2019

(87) PCT Pub. No.: WO2018/123666
PCT Pub. Date: Jul. 5, 2018

(65) Prior Publication Data
US 2020/0385830 A1    Dec. 10, 2020

(30) Foreign Application Priority Data
Dec. 27, 2016 (JP) .............................. JP2016-253633

(51) Int. Cl.
*C21C 7/064* (2006.01)
*C21C 7/00* (2006.01)

(52) U.S. Cl.
CPC .......... *C21C 7/0645* (2013.01); *C21C 7/0037* (2013.01); *C21C 7/0075* (2013.01)

(58) Field of Classification Search
CPC ..... C21C 7/0645; C21C 7/0037; C21C 1/025; C21C 7/064; C21C 7/072; C21C 7/076; C21C 1/02; C21C 7/00; C21C 7/0075
USPC .......................................................... 75/560
See application file for complete search history.

(56) References Cited

U.S. PATENT DOCUMENTS

2014/0311295 A1* 10/2014 Uchida ................... C21C 1/025
75/539

FOREIGN PATENT DOCUMENTS

| CN | 103103312 A | 5/2013 |
|----|-------------|--------|
| EP | 1445337 A1  | 8/2004 |
| JP | 57140809 A  | 8/1982 |
| JP | 5953612 A   | 3/1984 |

(Continued)

OTHER PUBLICATIONS

Jean-Michel Commandre, Sylvain Salvador, Ange Nzihou. Reactivity of laboratory and industrial limes. Chemical Engineering Research and Design, Elsevier, 2007, 85 (4), pp. 473-480 (Year: 2007).*

(Continued)

*Primary Examiner* — Brian D Walck
*Assistant Examiner* — Danielle Carda
(74) *Attorney, Agent, or Firm* — RatnerPrestia

(57) ABSTRACT

When performing dephosphorization treatment of hot metal by adding a refining agent as a lime source and an oxygen source (dephosphorizing agent(s) and a gaseous oxygen source into the hot metal accommodated in a hot metal holding container, the refining agent used is a refining agent having an Ig-loss value of from 4.0% by mass to 35.0% by mass and including 60% by mass or more of quicklime.

8 Claims, 1 Drawing Sheet

(56) References Cited

FOREIGN PATENT DOCUMENTS

| JP | 62109913 | A | | 5/1987 |
|----|----------|---|---|--------|
| JP | 02250914 | A | | 10/1990 |
| JP | 07118722 | A | | 5/1995 |
| JP | 083611 | A | | 1/1996 |
| JP | 1171611 | A | | 3/1999 |
| JP | 2001288507 | A | | 10/2001 |
| JP | 2004115857 | A | | 4/2004 |
| JP | 2005139545 | A | * | 6/2005 |
| JP | 2007277666 | A | | 10/2007 |
| JP | 2008138281 | A | | 6/2008 |
| JP | 2009108344 | A | | 5/2009 |
| JP | 5135836 | B2 | | 2/2013 |
| KR | 1020040033325 | A | | 4/2004 |
| SU | 779407 | A1 | | 11/1980 |
| TW | 201628992 | A | | 8/2016 |

OTHER PUBLICATIONS

Translation JP-2005139545-A (Year: 2005).*
Monastyrev, A.V. et al., "General Knowledge of Lime, Feedstock and Fuel for Production Thereof, Physicochemical Principles of Baking Process," Lime Furnaces, Moscow, Metallurgy, 1979, 8 pages, Table 3.
Russian Office Action for Russian Application No. 2019118906, dated Jan. 31, 2020, with translation, 12 pages.
Extended European Search Report for European Application No. 17887903.7, dated Sep. 13, 2019, 9 pages.
International Preliminary Report on Patentability for International Application No. PCT/JP2017/045197, dated Jul. 2, 2019, 7 pages.
International Search Report and Written Opinion for International Application No. PCT/JP2017/045197, dated Mar. 6, 2018—5 pages.
Taiwanese Search Report for Taiwanese Application No. 106145191, dated Dec. 22, 2017—8 pages.
River Sands; "Technical Data Sheet Easy Mix Hydrated Lime," Sep. 1, 2016, XP055684947, [retrieved on Apr. 9, 2020], one page.
Mississippi Lime: "Pulverized Quicklime 100 Calcium Oxide Technical Data Sheet Product Description," Jan. 31, 2008, XP055684946, [retrieved on Apr. 9, 2020], one page.
Cardoso, F.A., et al., "Carbide lime and industrial hydrated lime characterization," Oct. 25, 2009, vol. 195(2), pp. 143-149, XP026338860, Powder Technology—Electrostatic Phenomena in Particulate Processes, Elsevier, Basel (CH).
European Communication pursuant to Article 94(3) for European Application No. 17 887 903.7, dated Apr. 17, 2020, 7 pages.
Japanese Office Action for Japanese Application No. 2018-559056, dated Apr. 7, 2020, with Concise Statement of Relevance of Office Action, 7 pages.
Chinese Office Action with Search Report for Chinese Application No. 201780080789.8, dated Feb. 20, 2021, 7 pages.
Chinese Office Action with Search Report for Chinese Application No. 201780080789.8, dated Aug. 10, 2020, 7 pages.
Russian Office Action for Russian Application No. 2019118906, dated Jun. 17, 2020, with translation, 8 pages.
GOST 9179-77, Jan. 1, 1979, 7 pages.
"Building quicklime", 2006, with partial English translation, 36 pages.
Korean Office Action dated Aug. 27, 2021 for Korean Application No. 2019-7017142 with Concise Statement of Relevance of Office Action, 6 pages.

* cited by examiner

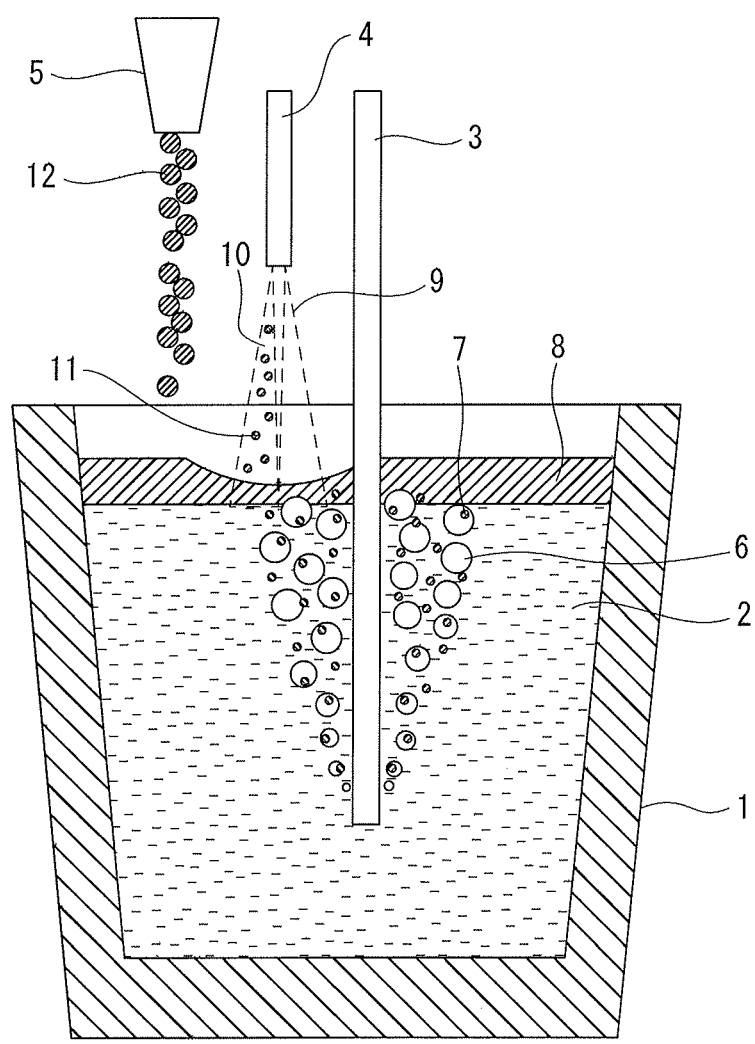

METHOD FOR DEPHOSPHORIZATION OF HOT METAL, AND REFINING AGENT

CROSS REFERENCE TO RELATED APPLICATIONS

This is the U.S. National Phase application of PCT/JP2017/045197, filed Dec. 15, 2017, which claims priority to Japanese Patent Application No. 2016-253633, filed Dec. 27, 2016, the disclosures of these applications being incorporated herein by reference in their entireties for all purposes.

FIELD OF THE INVENTION

The present invention relates to a method for dephosphorizing hot metal and to a refining agent.

BACKGROUND OF THE INVENTION

In recent years, quality requirements for steel materials have become increasingly stringent, and there is a demand for reducing impurity elements typified by phosphorus and sulfur. To cope with such a demand, it is common to perform dephosphorization treatment at a stage of hot metal in a steel manufacturing process. The dephosphorization treatment is performed as follows: An oxygen source such as gaseous oxygen (an oxygen gas) or a solid iron oxide is supplied as a dephosphorizing agent to the hot metal to oxidize phosphorus in the hot metal with oxygen in the dephosphorizing agent so as to produce phosphorus oxide ($P_2O_5$); and the produced phosphorus oxide is allowed to be absorbed into slag for dephosphorization refining.

In general, lime-based refining agents are used as refining agents for forming the slag for dephosphorization refining. Additionally, in the recent years, there has been a demand for reducing slag generated in a steel manufacturing process, from the viewpoint of environmental protection measures. Dephosphorization treatment of hot metal is a low temperature treatment advantageous to dephosphorization reaction, so that the treatment can be performed with a relatively small amount of slag. For such dephosphorization treatment of hot metal, processes in accordance with facilities and environments of individual steel making plants are selected and implemented, such as a method of adding a refining agent and top-blowing gaseous oxygen into a hot metal in a converter and a method of injection either a dephosphorizing agent or a dephosphorizing agent and a refining agent into hot metal accommodated in a torpedo car or a hot metal ladle.

Among them, the method using a converter can blow gaseous oxygen to hot metal at high flow rate, and thus is advantageous in terms of enabling hot metal having low phosphorus concentration to be melted in a short time. However, when the existing converter does not have sufficient capability and new installation is needed, high facility cost is necessary. Moreover, in addition to dephosphorization, decarburization also progresses inevitably, so that reduction of carbon concentration in the hot metal causes reduction of thermal margin in post-processes.

On the other hand, the method using a torpedo car or a hot metal ladle is a process using an existing hot metal transfer container and, therefore, inexpensive in terms of facility cost, so that merits of hot metal dephosphorization treatment can be obtained even in the case of insufficient converter capability. The method intends to promote slag formation of a refining agent and dephosphorization reaction in a bath by injection iron oxide as a dephosphorizing agent and the refining agent into the bath to ensure contact between the iron oxide and the refining agent in the bath. However, merely injection iron oxide and a refining agent thereinto is not enough to ensure opportunity for contact therebetween. Additionally, a refining agent is problematic in that it is hardly melted (slagged), and reaction time is short. In other words, the method using a torpedo car or a hot metal ladle has the problem of inefficient dephosphorization reaction, as compared with the method using a converter.

Thus, to efficiently perform dephosphorization reaction, in the method using a torpedo car or a hot metal ladle, a method has been widely used in which a $CaF_2$-based flux such as fluorite is used as a fluxing agent for CaO for a refining agent to improve the melting properties of slag so as to improve dephosphorization reactivity. For example, PTL 1 proposes a method in which the melting properties of slag for dephosphorization refining is improved by using a $CaF_2$-based flux such as fluorite as a fluxing agent for CaO for a refining agent, thereby improving dephosphorization reactivity. However, there has been a high demand in the recent years for development of a method that enables highly efficient dephosphorization treatment without using a $CaF_2$-based flux such as fluorite.

For example, as a method for efficiently performing dephosphorization treatment without using a $CaF_2$-based flux, PTL 2 proposes a method in which when performing dephosphorization treatment of hot metal by adding iron oxide into the hot metal held in a hot metal holding container from above a bath surface of the hot metal and also injection a lime-based refining agent into under the bath surface thereof, the dephosphorization treatment is performed by adding iron oxide such that an iron oxide charging region on the bath surface overlaps with 40% or more, in terms of area ratio, of an injection region of the lime-based refining agent on the bath surface.

In addition, PTL 3 proposes a method in which when performing dephosphorization treatment by blowing gaseous oxygen to hot metal held in a hot metal holding container from above a bath surface of the hot metal and also injection either a lime-based refining agent or a lime-based refining agent and a solid dephosphorizing agent (iron oxide) together with a carrier gas into under the bath surface, a top-blowing intensity of the gaseous oxygen is set to be within a predetermined level range, and a positional relationship between a top-blowing position of the gaseous oxygen and a blowing region of the carrier gas on the bath surface is specified to promote slag formation of the lime-based refining agent and dephosphorization reaction.

PATENT LITERATURE

PTL 1: JP H08-3611 A
PTL 2: JP 2001-288507 A
PTL 3: JP 5135836 B

SUMMARY OF THE INVENTION

However, the dephosphorization methods using a torpedo car or a hot metal ladle disclosed in PTL 2 and PTL 3 have a problem in that while the amount of the $CaF_2$-based flux to be used can be significantly reduced, dephosphorization rate is lower than in the use of a $CaF_2$-based flux. Due to this, from the viewpoint of efficient dephosphorization treatment, the dephosphorization methods using no $CaF_2$-based flux require further improvement in the efficiency of dephosphorization treatment.

Accordingly, aspects of the present invention have been made by focusing on the above problem, and it is an object according to aspects of the present invention to provide a method for dephosphorizing hot metal and refining agent by which the efficiency of dephosphorization treatment can be improved without using any $CaF_2$-based flux.

According to one aspect of the present invention, there is provided a method for dephosphorizing hot metal, wherein, when performing dephosphorization treatment of the hot metal by adding a refining agent as a lime source and an oxygen source to a hot metal accommodated in a hot metal holding container, a refining agent having an Ig-loss value of from 4.0% by mass to 35% by mass and including 60% by mass or more of quick lime is used as the refining agent.

According to one aspect of the present invention, there is provided a refining agent having an Ig-loss value of from 4.0% by mass to 35% by mass, including 60% by mass or more of quick lime, and used for dephosphorization treatment of hot metal.

According to the one aspect of the present invention, there are provided the method for dephosphorizing hot metal and the refining agent by which the efficiency of dephosphorization treatment can be improved without using any $CaF_2$-based flux.

BRIEF DESCRIPTION OF DRAWINGS

The FIGURE is a descriptive diagram illustrating a method for dephosphorizing hot metal according to one embodiment of the present invention.

DETAILED DESCRIPTION OF EMBODIMENTS OF THE INVENTION

In the detailed description hereinbelow, a large number of specific details are described to provide complete understanding of embodiments of the present invention. However, even without such specific details, it will be obvious that one or more embodiments can be implemented. Additionally, to simplify the drawing, known structures and devices are schematically illustrated.

First, prior to the present invention, the present inventors conducted various experiments and investigations using ladle type hot metal holding containers in order to find a method enabling highly efficient dephosphorization treatment without using a $CaF_2$-based refining agent such as fluorite, as a fluxing agent for CaO for a lime-based refining agent. As a result, as described above, the present inventors have confirmed that a $CaF_2$-based flux plays an important role in ensuring the melting properties of slag, and when no $CaF_2$-based flux was used in combination in the experiments by the present inventors, the added refining agent was apparently not formed into slag, and the efficiency of dephosphorization reaction was also lowered.

However, during repeated experiments, the present inventors have found that adding a lime-based refining agent having an Ig-loss value of from 4.0% by mass to 35.0% by mass significantly improves dephosphorization efficiency, and additionally, when performing injection of the refining agent together with a carrier gas from an injection lance immersed in hot metal, satisfying Formulas (1) to (3) further improves dephosphorization efficiency, and thereby have developed the present invention. Note that the Ig-loss (Ignition Loss) is measured as a weight loss (derived from volatile components such as $H_2O$ and $CO_2$) when a sample is intensely heated at 1050±50° C. until it reaches a constant weight. In the experiments, about 1 g of the sample was weighed up to 0.1 mg in a platinum crucible or a magnetic crucible, heated for 1 hour in an electric furnace controlled at 1050±50° C., and allowed to cool, followed by measurement of mass. Then, Ig-loss value was calculated by Formula (4):

[Math. 1]

$$300 \leq \varepsilon_g + \varepsilon_P \leq 1000 \tag{1}$$

$$\varepsilon_g = 6.183 \times \frac{Q \times T_1}{W} \times \left( \ln\left(1 + \frac{h}{1.02 \times 10^{-4} \times P}\right) + \left(1 - \frac{T_g}{T_l}\right) \right) \tag{2}$$

$$\varepsilon_P = 2.25 \times 10^{-5} \times m \times \frac{Q^2}{d_0^4 \times W} \tag{3}$$

$$Ig.loss = \frac{m_1}{m_0} \times 100 \tag{4}$$

In Formulas (1) to (3), $\varepsilon_g$ represents a carrier gas stirring power [W/t]; $\varepsilon_p$ represents a lime source energy; Q represents a carrier gas flow rate [Nm$^3$/min] (note that N means a standard state of gas at 101325 Pa and 273.15 K); W represents a hot metal amount [t]; $T_1$ represents a hot metal temperature [° C.]; $T_g$ represents a carrier gas temperature [° C.]; h represents an injection lance immersion depth [m]; P represents an atmospheric pressure [Pa]; m represents a lime source injecting rate [g/s]; and do represents an injection lance nozzle diameter [cm]. In addition, in Formula (4), Ig. loss represents an ignition loss (Ig-loss value) [% by mass]; $m_0$ represents a sample refining agent mass [g] before heating; and $m_1$ represents a sample weight loss [g].

<Method for Dephosphorizing Hot Metal and Refining Agent>

With reference to the FIGURE, a description will be given of a method for dephosphorizing hot metal and a refining agent according to one embodiment of the present invention based on the above findings. In the present embodiment, as illustrated in the FIGURE, dephosphorization treatment of hot metal 2 is performed by using, as a reaction vessel, a hot metal holding container 1, which is a hot metal ladle.

The hot Metal 2 is tapped from a blast furnace, and may be subjected to desiliconization treatment in advance before the dephosphorization treatment. Examples of the desiliconization treatment to be performed in advance include blowing oxygen gas to the hot metal 2 or adding an oxidizing agent including a solid oxygen such as iron oxide to the hot metal 2 on a blast furnace cast floor or in a hot metal transfer container.

In the dephosphorization method according the present embodiment, the dephosphorization treatment of the hot metal 2 is performed using a dephosphorization treatment facility illustrated in the FIGURE. As illustrated in the FIGURE, the treatment facility includes an injection lance 3, a top-blowing lance 4, and a charging chute 5.

The injection lance 3 is a lance arranged extending in a vertical direction (an up and down direction of the FIGURE), and is arranged such that a center axis thereof substantially overlaps with a center of the hot metal holding container 1 in plan view. Additionally, the injection lance 3 is configured such that an upper end side in the vertical direction thereof is connected to an unillustrated elevating device so as to be elevatable in the vertical direction. Furthermore, the injection lance 3 includes an inner hole extending in the vertical direction thereinside and two squirting ports communicating with the inner hole and facing each other in a radial direction of the injection lance 3 on an outer peripheral surface on a lower end side of the vertical direction. In addition, in the injection lance 3, a carrier gas 6 and a refining agent 7 as a lime source are supplied through an upper end side of the inner hole from an unillustrated refining agent supply device. When performing the dephosphorization treatment, the injection lance 3 injects the carrier gas 6 and the refining agent 7 supplied from the refining agent supply device into the hot metal 2 through the two squirting ports while keeping the lower end side thereof immersed under a bath surface of the hot metal 2.

The carrier gas 6 is an inert gas (an inert gas such as Ar gas or $N_2$ gas), compressed air, or the like, which gas assists transfer of the refining agent 7 until it is injected into the hot metal, and also stirs the hot metal 2.

The refining agent 7 is a lime-based refining agent mainly containing CaO, which agent includes 60% or more of CaO and has an Ig-loss value of from 4.0% by mass to 35.0% by mass. Additionally, the refining agent 7 has a particle diameter of preferably 2 mm or less. Setting the particle diameter of the refining agent 7 to 2 mm or less improves melting (slag formation) rate of the refining agent 7. The refining agent 7 injected into the hot metal 2, while floating up in the hot metal 2, is melted (formed into slag) by heat of the hot metal 2 to form a slag 8 floating up on the bath surface of the hot metal 2.

Furthermore, in the refining agent 7, the sum of total pore volumes of pores having a pore diameter ranging from 0.5 μm to 10 μm is preferably 0.1 mL/g or more. This further promotes melting of CaO, so that dephosphorization efficiency can be further improved. In addition, the refining agent 7 has a specific surface area of preferably from 0.5 $m^2/g$ to 5 $m^2/g$. The specific surface area of the refining agent 7 can be measured by, for example, a BET method (a multipoint method). In the measurement method, for example, as a pretreatment, vacuum degassing is performed at 120° C. for 8 hours by using a device: BELPREP-vacll. Next, using a fixed volume method, an adsorption isotherm of nitrogen is measured to calculate a specific surface area. In the measurement of the adsorption isotherm, as one example, adsorption temperature is set to 77 K, adsorbate cross-sectional area is set to 0.162 $nm^2$, and saturated vapor pressure is set to a measured value. In addition, equilibrium waiting time after pressure change in adsorption/desorption reaches an adsorption equilibrium state, where the pressure change does not exceed a predetermined value, is set to 500 seconds. By setting the specific surface area of the refining agent 7 to be within the above range, wettability between the hot metal 2 and the refining agent 7 is physically improved, thus promoting entry of the hot metal 2 into the pores on the surface of the refining agent 7. As a result, the specific surface area of the refining agent 7 in contact with the hot metal 2 increases, which further promotes collapse of CaO, which will be described later, thereby improving dephosphorization efficiency.

Furthermore, the injection lance 3 may be configured to inject, if necessary, a mixture of a quick lime having an Ig-loss value of 4.0% by mass or less as a lime source and the refining agent 7, together with the carrier gas 6, into the hot metal 2.

The top-blowing lance 4 is a lance arranged above the hot metal holding container 1, and ejects gas and powder from two nozzles provided at a lower end thereof. In the present embodiment, the top-blowing lance 4 is formed with different paths of two routes including a path for supplying a gaseous oxygen source 9 and a path for supplying a carrier gas 10 and a dephosphorizing agent 11. Upper end sides of the paths of the two routes in the top-blowing lance 4 are respectively connected to a device (unillustrated) for supplying the gaseous oxygen source 9 and a device (unillustrated) for supplying the carrier gas 10 and the dephosphorizing agent 11. The gaseous oxygen source 9 and the carrier gas 10 including the dephosphorizing agent 11 supplied from the supply devices are respectively ejected from the two nozzles provided at the lower end of the top-blowing lance 4 toward the bath surface of the hot metal 2 below in the vertical direction.

The gaseous oxygen source 9 is an oxygen source in the dephosphorization treatment, and oxidizes phosphorus in the hot metal 2. As the gaseous oxygen source to be used, oxygen gas (including industrial pure oxygen), air, oxygen-enriched air, a mixed gas of oxygen gas and an inert gas, or the like can be used. In the case of ordinary dephosphorization treatment, oxygen gas is preferably used, because the dephosphorization reaction rate is faster than in the use of other gases. Additionally, in the case of use of a mixed gas, oxygen concentration is preferably set to be higher than that of air in order to ensure the dephosphorization reaction rate.

The carrier gas 10 ejected from the top-blowing lance 4 may be the same gas as the carrier gas 6 blown in from the injection lance 3 or may be oxygen gas.

The dephosphorizing agent 11 ejected from the top-blowing lance 4 is a solid oxygen source including an iron oxide source, and iron ore, mill scale, sand iron, collected dust (iron-containing dust collected from exhaustion gas in a blast furnace, a converter, a sintering process, or the like), or the like is used. The dephosphorizing agent 11 is preferably in a fine powder form having a particle diameter of 1 mm or less, and more preferably a sand iron or a fine iron ore powder having a particle diameter of 1 mm or less in a creation form, which does not require pulverization treatment. Furthermore, sand iron is particularly suitable, because it serves not only as a solid oxygen source, but also serves as a fluxing agent for CaO for the refining agent 7 mainly containing CaO due to its titanium oxide content ranging about from 7% by mass to 10% by mass.

The charging chute 5 is a chute arranged above in the vertical direction of the hot metal holding container 1, and adds a dephosphorizing agent 12 cut out from an unillustrated hopper to the bath surface of the hot metal 2. The dephosphorizing agent 12 added from the charging chute 5 is a solid oxygen source including an iron oxide source, like the dephosphorizing agent 11 ejected from the top-blowing lance 4. Additionally, the dephosphorizing agent 12 added from the charging chute 5 may be a dephosphorizing agent having a larger particle diameter than that of the dephosphorizing agent 11 ejected from the top-blowing lance 4. Note that the gaseous oxygen source 9 and the dephosphorizing agent 11 as the solid oxygen source ejected from the top-blowing lance 4 and the dephosphorizing agent 12 as the solid oxygen source added from the charging chute 5 are also collectively referred to as an oxygen source.

In the method for dephosphorizing the hot metal 2 according to the present embodiment, first, the hot metal holding container 1 accommodating the hot metal 2 is arranged at a predetermined treatment position of the dephosphorization treatment facility illustrated in the FIGURE, and the injection lance 3 is immersed under the bath surface of the hot metal 2.

Next, injection of the carrier gas 6 and the refining agent 7 from the injection lance 3 into the hot metal 2, ejection of the gaseous oxygen source 9 and of the carrier gas 10 and the dephosphorizing agent 11 from the top-blowing lance 4, and addition of the dephosphorizing agent 12 from the charging chute 5 are performed (dephosphorization treatment). In the dephosphorization treatment, in the hot metal holding container 1 serving as the reaction vessel, the refining agent 7 as the lime source mainly containing CaO, the gaseous oxygen source 9, and the solid oxygen source as the dephosphorizing agents 11 and 12 are added to the hot metal 2 to perform a dephosphorization reaction. In this case, the refining agent 7 is slagged to form the slag 8 that floats up on the bath surface of the hot metal 2. Additionally, the oxygen source oxidizes phosphorus in the hot metal 2 to produce phosphorus oxide. The produced phosphorus oxide is taken into the slag 8, resulting in removal of the phosphorus from the hot metal 2.

Herein, in the dephosphorization treatment, the hot metal 2 needs to be thoroughly stirred in order to effectively dephosphorizing the hot metal 2. Thus, when blowing the carrier gas 6 in from the injection lance 3, it is preferable to set a stirring power of 300 W/t or more for the hot metal 2 in order to obtain adequate stirrability. In addition, the stirring power for the hot metal 2 is preferably set to 1000 W/t or less, because when the hot metal 2 is excessively strongly stirred, the produced FeO may reduce carbon in the hot metal 2 at excessively high rate. Furthermore, as in the present embodiment, when performing dephosphorization treatment by injecting the refining agent 7 as the lime source and the carrier gas 6 from the injection lance 3 into the hot metal 2, the carrier gas 6 and the lime source are preferably injected thereinto under conditions satisfying the above Formulas (1) to (3). Setting to the conditions satisfying Formulas (1) to (3) allows the hot metal 2 to be stirred with more adequate stirrability, so that the dephosphorization treatment can be efficiently performed. In that case, the injection lance 3 has an immersion depth h of preferably 1.5 m or more. When the immersion depth h is less than 1.5 m, it is operationally not preferable, because blowing through of gas occurs, which causes intense scattering of the hot metal 2.

When the refining agent 7 as the lime source is injected into the hot metal 2 from the injection lance 3, reactions represented by the following Formulas (5) and (6) occur and produce $H_2O$ gas and $CO_2$ gas, which promotes collapse of CaO, so that slag formation of CaO is promoted. In the present embodiment, by setting the Ig-loss value to from 4.0% by mass to 35.0% by mass, $H_2O$ gas and $CO_2$ gas are moderately produced, and slag formation is promoted, thereby promoting dephosphorization reaction. Note that when the Ig-loss value is less than 4.0% by mass, production of $H_2O$ gas and $CO_2$ gas is reduced, and thus, the effect of improving the dephosphorization efficiency cannot be sufficiently obtained. On the other hand, when the Ig-loss value exceeds 35.0% by mass, a pure CaO content in the refining agent 7 is reduced, and thus, the effect of improving the dephosphorization efficiency cannot be sufficiently obtained. In addition, as described above, a mixture of a quick lime having an Ig-loss value of less than 4.0% by mass and the refining agent 7, as a lime source, may be injected thereinto. In this case, in the mixture injected in as the lime source, a proportion of the refining agent 7 is set to be preferably 20% by mass or more. When the proportion of the refining agent 7 is less than 20% by mass, the effect of promoting slag formation of CaO is reduced, so that the effect of improving the dephosphorization efficiency is reduced.

$$CaCO_3 \rightarrow CaO + CO_2 \quad (5)$$

$$Ca(OH)_2 \rightarrow CaO + H_2O \quad (6)$$

Additionally, under conditions where the hot metal 2 has a high Si concentration of 0.40% by mass or more, the slag 8 may be ejected from the hot metal holding container 1 due to foaming (a foaming phenomenon). Thus, when foaming occurs, it is necessary to reduce an oxygen feed rate for adding the oxygen source, which leads to reduction of productivity. However, by injecting the refining agent 7 into the hot metal 2 from the injection lance 3, the slag 8 is degassed by gasses such as $CO_2$ and $H_2O$ produced, thus enabling suppression of foaming of the slag 8. Note that, from the viewpoint of foaming suppression, a basicity of the slag 8 after the dephosphorization treatment (a mass ratio of CaO to $SiO_2$ in slag [% CaO]/[% $SiO_2$]) is controlled to be preferably about from 1.8 to 3.5.

The amount of the refining agent 7 to be added is appropriately determined according to a component of the hot metal 2 before dephosphorization treatment of the hot metal 2, a targeted component of the hot metal 2 after the dephosphorization treatment, the amount of the hot metal 2, and the like.

The gaseous oxygen source 9 ejected from the top-blowing lance 4 is blown onto the bath surface of the hot metal 2. In this case, preferably, a region (a fire point) of the bath surface of the hot metal 2 to which the gaseous oxygen source 9 is blown is superimposed on a region of the bath surface where the refining agent 7 injected from the injection lance 3 floats up, as illustrated in the FIGURE. Usually, at the fire point, decarburization reaction by the gaseous oxygen source 9 occurs predominantly, and due to heat generated by the decarburization reaction or the like, dephosphorization treatment is usually performed at a high temperature exceeding 2000° C. Due to this, superimposing the position of the fire point on the position of the bath surface where the refining agent 7 is supplied further promotes slag formation of the refining agent 7. However, usually, dephosphorization reaction is thermodynamically further promoted as the temperature is lower. Thus, reaction occurs at a peripheral portion at about 1800° C. or less, which is slightly away from the fire point. By contrast, the reactions represented by Formulas (5) and (6) regarding the refining agent 7 are endothermic reactions. Accordingly, by superimposing the position of the fire point on the bath surface where the refining agent 7 is supplied, an effect of cooling the fire point can also be obtained in addition to the above-described slag formation promoting effect. Thus, the dephosphorization reaction can be still further promoted.

In addition, in the dephosphorization treatment, the dephosphorizing agents 11 and 12 serving as the solid oxygen source are added to the hot metal 2 by blowing-in from the top-blowing lance 4 and charging from the charging chute 5. As described above, dephosphorization reaction is advantageous to some extent at low temperature. Thus, in principle, as the oxygen source contributing to dephosphorization reaction, the solid oxygen source is higher in efficiency than the gaseous oxygen source 9. Herein, while charging oxygen into the hot metal 2 causes decarburization reaction and dephosphorization reaction, charging the gaseous oxygen source 9 thereinto predominantly causes temperature rise due to heat generated by decarburization. By contrast, when the solid oxygen source is charged thereinto, temperature rise is suppressed due to heat absorption in decomposition of the solid oxygen source. In other words, the use of the solid oxygen source allows maintaining of a temperature advantageous to dephosphorization reaction. However, promoting the dephosphorization reaction requires temperature conditions such that allow the solid oxygen source to be melted. Additionally, the solid oxygen source becomes FeO after being melted, and serves to increase a FeO component in the slag 8 contributing to the dephosphorization reaction, thus promoting the dephosphorization reaction in combination with the effect of suppressing temperature rise described above.

Furthermore, in the dephosphorization treatment, as illustrated in the FIGURE, the dephosphorizing agent 11 ejected together with the carrier gas 10 from the top-blowing lance 4 is preferably blown to a vicinity of the fire point on the bath surface where the gaseous oxygen source 9 is ejected. By doing this, the dephosphorizing agent 11 as the solid oxygen source added from the top-blowing lance 4 is supplied to the region close to the fire point, where the dephosphorization reaction is substantially promoted. In addition, the dephosphorizing agent 11 is supplied with the carrier gas 10 lower in oxygen concentration than the gaseous oxygen source 9. Due to this, the temperature of the region where the dephosphorizing agent 11 is supplied does not excessively rise, so that dephosphorization is further promoted by favorable reactivity of the dephosphorizing agent 11. For example, according to thermodynamic estimation, dephosphorization capability at 1800° C. is substantially doubled as compared with dephosphorization capability at 2000° C.

It is sufficient that an amount of addition of the solid oxygen source, which is a total amount of addition of the dephosphorizing agents 11 and 12, is equal to or more than an amount such that FeO concentration rise in the slag 8 becomes sufficient in accordance with facility specifications, because dephosphorization is not promoted when the FeO concentration rise in the slag 8 is reduced. In addition, an upper limit of the amount of addition of the solid oxygen source may be set to an amount such that heat removal by the solid oxygen source is not problematic, in accordance with facility specifications. For example, in the case of dephosphorization treatment using the hot metal holding container 1 having a capacity of from 100 tons to 350 tons, the solid oxygen source is added in a range of preferably from 0.1 kg to 2 kg with respect to 1 $Nm^3$ of an oxygen gas purity in the standard state of the gaseous oxygen source 9 supplied to the bath surface. When the amount of the solid oxygen source added is less than 0.1 kg, the effect expected in the present treatment manner cannot be sufficiently obtained. On the other hand, when the amount of the solid oxygen source added exceeds 2 kg, the heat removal on the surface where the solid oxygen source is supplied becomes large, whereby formation of the slag 8 becomes insufficient, resulting in reduced dephosphorization capability. Note that a more preferable amount of the solid oxygen source to be added is from 0.3 kg to 2 kg.

In addition, a ratio between the dephosphorizing agent 11 added from the top-blowing lance 4 and the dephosphorizing agent 12 added from the charging chute 5 is appropriately determined according to the amount of the solid oxygen source to be added, facility specifications, and the like. Note that, as described above, since the dephosphorizing agent 11 is preferably added to the vicinity of the fire point of the gaseous oxygen source 9, it is preferable to set the amount of addition of the dephosphorizing agent 11 to a maximum amount that can be added during the dephosphorization treatment under addition conditions such that dephosphorization efficiency is maximized, and set the amount of addition of a solid oxygen source necessary other than that to the amount of addition of the dephosphorizing agent 12. In this case, when the addition of the dephosphorizing agent 11 from the top-blowing lance 4 suffices, the addition of the dephosphorizing agent 12 from the charging chute 5 does not have to be performed.

Moreover, as described above, when the gaseous oxygen source 9 is used as the oxygen source, the temperature of the hot metal 2 rises due to oxidation reaction heat. On the other hand, when the solid oxygen source is used as an oxygen source, the temperature of the hot metal 2 drops because a sensible heat, a latent heat, and a decomposition heat of the solid oxygen source itself are larger than the oxidation reaction heat. Thus, a usage ratio between the solid oxygen source and the gaseous oxygen source 9 is set in accordance with temperatures of the hot metal 2 before and after the treatment while maintaining the above range.

To perform dephosphorization efficiently, the FeO concentration in the slag 8 is suitably in a range of from 10% by mass to 50% by mass, and more suitably in a range of from 10% by mass to 30% by mass. Thus, it is preferable to adjust the amount or rate of supply of the solid oxygen source so that the FeO concentration in the slag 8 is maintained in the above range during the dephosphorization treatment.

In the dephosphorization treatment performed under the above conditions, the treatment is ended when the temperature and component of the hot metal 2 become targeted ones or when the oxygen sources are added by preset amounts. Note that it is unnecessary to continuously perform the addition of the gaseous oxygen source 9 and the dephosphorizing agent 11 from the top-blowing lance 4 and the addition of the dephosphorizing agent 12 from the charging chute 5 throughout the entire period of the dephosphorization treatment, and additions thereof may be performed intermittently. Additionally, while the addition of the refining agent 7 from the injection lance 3 may also be intermittently performed, the injection of the carrier gas 6 intended to stir the hot metal 2 is preferably performed continuously throughout the entire period of the dephosphorization treatment.

<Modifications>

While aspects of the present invention have been described hereinabove with reference to the specific embodiment, it is not intended to limit the invention thereto. With reference to the detailed description of embodiments of the present invention, various modifications of the disclosed embodiment and other embodiments of the invention will become apparent to those skilled in the art. Accordingly, it is to be understood that the claims are intended to cover all such modifications or embodiments included in the scope and spirit of the present invention.

For example, while, in the above embodiment, the hot metal holding container 1 has been a hot metal ladle, the present invention is not limited to the example. The hot metal holding container 1 can be any container that can accommodate the hot metal 2 and that allows for treatment in the same dephosphorization treatment facility as that described above, and, for example, may be a container such as a torped car, which is a hot metal transfer container.

In addition, while the above embodiment is configured such that the carrier gas 6 and the refining agent 7 are injected from the injection lance 3, the gaseous oxygen source 9, the carrier gas 10, and the dephosphorizing agent 11 serving as the solid oxygen source are blown in from the top-blowing lance 4, and the dephosphorizing agent 12 serving as the solid oxygen source is blown in from the charging chute 5, the present invention is not limited to the example. In the dephosphorization method according to aspects of the present invention, the following other structures may be used as long as at least one of the solid oxygen source and the gaseous oxygen source 9 and the refining agent 7 including the same component as that of the embodiment are added to the hot metal 2 accommodated in the hot metal holding container 1 and the hot metal 2 is stirred.

For example, either the solid oxygen source alone or the gaseous oxygen source 9 alone may be used as the oxygen source. Note that as long as it is ordinary treatment, both the solid oxygen source and the gaseous oxygen source 9 are preferably used from the viewpoint of promotion of slag formation of the refining agent 7 and promotion of dephosphorization, although it varies depending on temperatures of the hot metal 2 before and after the treatment.

Additionally, the solid oxygen source may be charged from the top-blowing lance 4 alone or the charging chute 5 alone. Note that since there can be obtained improvement of oxygen potential of the slag 8 and the dephosphorization promotion effect by cooling of the fire point, the solid oxygen source is preferably added (blasted) together with the carrier gas 10 from the top-blowing lance 4. In addition, when adding the solid oxygen source from the charging chute 5 alone, the solid oxygen source is preferably added to the vicinity of the fire point on the bath surface of the hot metal 2 due to the same reason as in the charging from the top-blowing lance 4.

Furthermore, the solid oxygen source may be injected together with the carrier gas 6 from the injection lance 3. In this case, a dephosphorizing agent that is a solid oxygen source injected from the injection lance 3 may be configured to be the same as the dephosphorizing agents 11 and 12 of the above embodiment. Additionally, from the injection lance 3, the solid oxygen source alone may be injected together with the carrier gas 6, or the solid oxygen source and the refining agent 7 may be injected together with the carrier gas 6. Note that, in the case of blowing-in of the solid oxygen source alone together with the carrier gas 6, the refining agent 7 may be added from the charging chute 5 or may be added together with the carrier gas 10 from the top-blowing lance 4.

Still furthermore, for example, the gaseous oxygen source 9 may be blown in from the injection lance 3. In this case, the gaseous oxygen source 9 may be blown in from the injection lance 3 alone or may be blown in from both the top-blowing lance 4 and the injection lance 3. Additionally, simultaneously with the gaseous oxygen source 9, at least one of the refining agent 7 and the solid oxygen source may be injected from the injection lance 3.

Moreover, for example, the refining agent 7 may be added to the hot metal 2 from the top-blowing lance 4 or the charging chute 5. In this case, when adding the refining agent 7 from the top-blowing lance 4, the refining agent 7 is ejected together with the carrier gas 10 to the hot metal 2, as in the case of addition of the dephosphorizing agent 11. Additionally, the refining agent 7 added from the top-blowing lance 4 or the charging chute 5 can be any refining agent that has an Ig-loss value of from 4.0% by mass to 35.0% by mass, while the particle diameter and the specific surface area thereof may be different from those of the above embodiment.

Furthermore, while, in the above embodiment, the hot metal 2 has been stirred by the carrier gas 6 blown in from the injection lance 3, the present invention is not limited to the example. For example, the hot metal 2 may be stirred by blowing a stirring gas that is the same as the carrier gas 6 into the hot metal 2 from a nozzle embedded in a furnace bottom of the hot metal holding container 1. Note that when stirring by the blowing-in of the stirring gas from the nozzle of the furnace bottom, dephosphorization treatment may be performed by using at least one of the top-blowing lance 4 and the charging chute 5, without using the injection lance 3. In this case, addition of the oxygen source and the refining agent 7 to the hot metal 2 is performed by using at least one of the top-blowing lance 4 and the charging chute 5.

<Effects of Embodiments>

(1) In the method for dephosphorizing the hot metal 2 according to one aspect of the present invention, when performing dephosphorization treatment of the hot metal 2 by adding the refining agent 7 as a lime source and an oxygen source (the dephosphorizing agent(s) 11, 12 and the gaseous oxygen source 9) into the hot metal 2 accommodated in the hot metal holding container 1, a refining agent having an Ig-loss value of from 4.0% by mass to 35.0% by mass and including 60% by mass or more of quick lime is used as the refining agent 7.

According to the structure (1), when performing the dephosphorization treatment by using the lime-based refining agent 7 having excellent reactivity, $H_2O$ gas and $CO_2$ gas are moderately generated, which promotes slag formation, thereby promoting dephosphorization reaction. As a result, high dephosphorization efficiency can be obtained, and an used amount of the refining agent 7 to be used can be reduced, so that there can be obtained excellent effects such as reduction of dust generation caused by the treatment, reduction of treatment cost, and reduction of the amount of generated slag. Additionally, the generation of $H_2O$ gas and $CO_2$ gas suppresses foaming of the slag 8, which suppresses ejection of the slag 8 in the process of dephosphorization treatment, thus enabling improvement in productivity. Furthermore, since it is only necessary to adjust the Ig-loss value of the refining agent 7, the dephosphorization method can be easily introduced even in existing facilities. Still furthermore, since slag formation is promoted without using a $CaF_2$-based flux, the efficiency of the dephosphorization treatment can be improved.

(2) In the structure (1), when adding the refining agent 7, the refining agent 7 together with the carrier gas 6 is injected through the injection lance 3 immersed under the bath surface of the hot metal 2 under conditions satisfying Formulas (1) to (3).

According to the structure (2), when injecting the refining agent 7 into the hot metal 2 from the injection lance 3, stirring conditions are optimized to stir with sufficient stirrability, thus enabling further improvement in the dephosphorization efficiency.

(3) In the structure (1) or (2), the specific surface area of the refining agent 7 is set to from 0.5 $m^2/g$ to 5 $m^2/g$.

According to the structure (3), wettability between the hot metal 2 and the refining agent 7 is improved, thus enabling further improvement in the dephosphorization efficiency.

(4) In any of the structures (1) to (3), the refining agent 7 alone is used as the lime source.

According to the structure (4), using as the lime source the refining agent 7 alone, which is highly reactive and excellent in slag formation, can further improve the dephosphorization efficiency.

(5) The refining agent according to one aspect of the present invention has an Ig-loss value of from 4.0% by mass to 35.0% by mass, includes 60% by mass or more of quick lime, and is used for dephosphorization treatment of hot metal.

According to the structure (5), the same effects as those of the structure (1) can be obtained.

Example 1

Next, Example 1 performed by the present inventors will be described. In Example 1, in the dephosphorization method according to the above embodiment, the Ig-loss value of the lime source as the refining agent 7 was changed to perform dephosphorization treatments and investigate influence of the Ig-loss value on dephosphorization rate.

In Example 1, first, the hot metal 2 tapped from the blast furnace and desiliconized on the blast furnace cast floor was transferred/injected into a hot metal ladle with a capacity of 250 tons as the hot metal holding container 1, and transferred to the dephosphorization treatment facility illustrated in the FIGURE. Next, in the dephosphorization treatment facility, dephosphorization treatment was performed by injection of the refining agent 7 from the injection lance 3, injection of the gaseous oxygen source 9 and the dephosphorizing agent 11 from the top-blowing lance 4, and addition of the dephosphorizing agent 12 from the charging chute 5. Note that the hot metal 2 before the dephosphorization treatment had a silicon concentration of 0.15% by mass, a carbon concentration of 4.5% by mass, and a phosphorus concentration of from 0.121% by mass to 0.125% by mass.

In Example 1, as a solid oxygen source for the dephosphorizing agents 11 and 12, a total amount of 10 kg/t (an amount per ton of hot metal) of sand iron having an average particle diameter of 500 μm was added from the top-blowing lance 4 and the charging chute 5. When injecting the dephosphorizing agent 11 from the top-blowing lance 4, an inert gas was used as the carrier gas 10. Additionally, the gaseous oxygen source 9 was injected from the top-blowing lance 4 into the hot metal 2 at an oxygen feed rate of from 1500 Nm³/hr to 2000 Nm³/hr. Furthermore, a lance height of the top-blowing lance 4 (a distance from the lower end of the top-blowing lance 4 to the bath surface of the hot metal 2) was from 1.0 m to 1.5 m. As the lime source, a mixture of 50% by mass of a lime-based refining agent 7 and 50% by mass of quick lime was used. The refining agent 7 had an Ig-loss value of from 4.0% by mass to 35.0% by mass and a specific surface area of from 0.41 to 0.42 m²/g. Additionally, when performing the injection of the refining agent 7, an inert gas was used as the carrier gas 6, and the stirring power ($\varepsilon_g + \varepsilon_p$) depicted in Formula (1), which is the sum of a carrier gas stirring power and a lime source energy, was set to 265 W/t. In addition, dephosphorization treatment time, which is a treatment time for supplying a predetermined amount of an oxygen source to the hot metal 2, was from 15 minutes to 25 minutes. Slag basicity was adjusted to be 2.0.

Furthermore, in Example 1, dephosphorization treatments for comparison were performed under conditions in which the Ig-loss value of the refining agent 7 was different from those of the above embodiment (Comparative Example 1). In Comparative Example 1, the Ig-loss value was set to 3.0% by mass or less or 36.0% by mass or more, and conditions of the dephosphorization treatments other than that were set to be the same as those of Example 1.

Table 1 depicts conditions of the stirring power and the refining agent in Example 1 and investigation results regarding phosphorus concentrations in the hot metal 2 before and after the treatments and dephosphorization rates (phosphorus removal rates in the hot metal 2 between before and after the dephosphorization treatments. Table 1 confirmed that all conditions led to high dephosphorization rates of 60% or more.

TABLE 1

| Conditions | Ig-loss [% by mass] | Component of hot metal (phosphorus concentration) | | Dephosphorization rate [% by mass] |
|---|---|---|---|---|
| | | Before treatment [% by mass] | After treatment [% by mass] | |
| Comp. Ex. 1-1 | 1.0 | 0.123 | 0.060 | 51 |
| Comp. Ex. 1-2 | 2.0 | 0.124 | 0.053 | 57 |
| Comp. Ex. 1-3 | 3.0 | 0.125 | 0.042 | 58 |
| Ex. 1-1 | 4.0 | 0.125 | 0.040 | 60 |
| Ex. 1-2 | 5.0 | 0.125 | 0.038 | 70 |
| Ex. 1-3 | 6.0 | 0.121 | 0.036 | 70 |
| Ex. 1-4 | 7.0 | 0.123 | 0.035 | 72 |
| Ex. 1-5 | 8.0 | 0.125 | 0.035 | 73 |
| Ex. 1-6 | 9.0 | 0.124 | 0.034 | 73 |
| Ex. 1-7 | 10.0 | 0.125 | 0.033 | 74 |
| Ex. 1-8 | 12.0 | 0.124 | 0.032 | 74 |
| Ex. 1-9 | 14.0 | 0.125 | 0.030 | 76 |
| Ex. 1-10 | 16.0 | 0.123 | 0.030 | 77 |
| Ex. 1-11 | 18.0 | 0.123 | 0.031 | 75 |
| Ex. 1-12 | 20.0 | 0.123 | 0.033 | 73 |
| Ex. 1-13 | 22.0 | 0.122 | 0.035 | 70 |
| Ex. 1-14 | 24.0 | 0.124 | 0.037 | 70 |
| Ex. 1-15 | 26.0 | 0.125 | 0.039 | 69 |
| Ex. 1-16 | 28.0 | 0.123 | 0.041 | 66 |
| Ex. 1-17 | 30.0 | 0.125 | 0.043 | 68 |
| Ex. 1-18 | 32.0 | 0.122 | 0.047 | 61 |
| Ex. 1-19 | 34.0 | 0.124 | 0.048 | 62 |
| Ex. 1-20 | 35.0 | 0.124 | 0.049 | 60 |
| Comp. Ex. 1-4 | 36.0 | 0.123 | 0.061 | 50 |
| Comp. Ex. 1-5 | 37.0 | 0.125 | 0.067 | 46 |
| Comp. Ex. 1-6 | 38.0 | 0.123 | 0.068 | 44 |
| Comp. Ex. 1-7 | 40.0 | 0.122 | 0.071 | 42 |

Example 2

Next, Example 2 performed by the present inventors will be described. In Example 2, in the dephosphorization method according to the above embodiment, the stirring power ($\varepsilon_g + \varepsilon_p$) of Formula (2) was changed to perform dephosphorization treatments and investigate influence of the stirring power on dephosphorization rate.

In Example 2, under the same conditions as those of Example 1-11, the stirring power ($\varepsilon_g + \varepsilon_p$) was changed to from 265 W/t to 1392 W/t to perform the dephosphorization treatments, respectively. Note that phosphorus concentrations in the hot metal 2 before the dephosphorization treatments were from 0.121% by mass to 0.125% by mass. Other conditions than them were the same as those of Example 1-11.

Table 2 depicts conditions of the stirring power and the refining agent in Example 2 and investigation results regarding phosphorus concentrations in the hot metal 2 before and after the treatments and dephosphorization rates.

Table 2 confirmed that while all conditions led to high dephosphorization rates of 76% or more, setting the stirring power ($\varepsilon_g + \varepsilon_p$) to be within a range of from 300 W/t to 1000 W/t further improved dephosphorization rates.

TABLE 2

| Conditions | Stirring power [W/t] | Ig-loss [% by mass] | Component of hot metal (phosphorus concentration) | | Dephosphorization rate [%] |
|---|---|---|---|---|---|
| | | | Before treatment [% by mass] | After treatment [% by mass] | |
| Ex. 2-1 | 265 | 18.0 | 0.123 | 0.029 | 76 |
| Ex. 2-2 | 298 | 18.0 | 0.124 | 0.025 | 80 |
| Ex. 2-3 | 457 | 18.0 | 0.125 | 0.024 | 81 |
| Ex. 2-4 | 582 | 18.0 | 0.124 | 0.022 | 82 |
| Ex. 2-5 | 797 | 18.0 | 0.124 | 0.023 | 81 |
| Ex. 2-6 | 996 | 18.0 | 0.121 | 0.024 | 80 |
| Ex. 2-7 | 1392 | 18.0 | 0.123 | 0.028 | 77 |

Example 3

Next, Example 3 performed by the present inventors will be described. In Example 3, in the dephosphorization method according to the above embodiment, the specific surface area of the refining agent 7 was changed to perform dephosphorization treatments and investigate influence of the specific surface area of the refining agent 7 on dephosphorization rate.

In Example 3, under the same conditions as those of Example 2-3, the specific surface area of the refining agent 7 was changed to from 0.41 $m^2/g$ to 5.13 $m^2/g$ to perform the dephosphorization treatments, respectively. Note that phosphorus concentrations in the hot metal 2 before the dephosphorization treatments were from 0.121% by mass to 0.125% by mass. Other conditions than them were the same as those of Example 2-3.

Table 3 depicts conditions of the stirring power and the refining agent in Example 3 and investigation results regarding phosphorus concentrations in the hot metal 2 before and after the treatments and dephosphorization rates.

Table 3 confirmed that all conditions led to high dephosphorization rates of 80% or more, and furthermore, setting the specific surface area to be within a range of from 0.5 $m^2/g$ to 5 $m^2/g$ further improved dephosphorization rates.

TABLE 3

| | | Refining agent | | | Component of hot metal (phosphorus concentration) | | |
| --- | --- | --- | --- | --- | --- | --- | --- |
| Conditions | Stirring power [W/t] | Proportion of refining agent in lime source [% by mass] | Specific surface area [$m^2/g$] | Ig-loss [% by mass] | Before treatment [% by mass] | After treatment [% by mass] | Dephosphorization rate [%] |
| Ex. 3-1 | 457 | 50 | 0.41 | 18.0 | 0.123 | 0.023 | 81 |
| Ex. 3-2 | 457 | 50 | 0.52 | 18.0 | 0.124 | 0.020 | 84 |
| Ex. 3-3 | 457 | 50 | 1.02 | 18.0 | 0.125 | 0.019 | 85 |
| Ex. 3-4 | 457 | 50 | 1.89 | 18.0 | 0.125 | 0.018 | 86 |
| Ex. 3-5 | 457 | 50 | 2.73 | 18.0 | 0.125 | 0.017 | 86 |
| Ex. 3-6 | 457 | 50 | 3.48 | 18.0 | 0.121 | 0.017 | 86 |
| Ex. 3-7 | 457 | 50 | 4.23 | 18.0 | 0.124 | 0.018 | 85 |
| Ex. 3-8 | 457 | 50 | 4.89 | 18.0 | 0.123 | 0.020 | 84 |
| Ex. 3-9 | 457 | 50 | 5.13 | 18.0 | 0.123 | 0.024 | 80 |

Example 4

Next, Example 4 performed by the present inventors will be described. In Example 4, in the dephosphorization method according to the above embodiment, the proportion of the refining agent 7 in the lime source and the stirring power were changed to perform dephosphorization treatments and investigate influence of the proportion of the refining agent 7 and the stirring power on dephosphorization rate.

In Example 4, under the same conditions as those of Example 3-5, the stirring power was set to 457 W/t or 726 W/t, and the proportion of the refining agent 7 in the lime source was changed to from 50% to 100% to perform the dephosphorization treatments, respectively. Note that phosphorus concentrations in the hot metal 2 before the dephosphorization treatments were from 0.124% by mass to 0.126% by mass. Other conditions than them were the same as those of Example 3-5.

Table 4 depicts conditions of the stirring power and the refining agent in Example 4 and investigation results regarding phosphorus concentrations in the hot metal 2 before and after the treatments and dephosphorization rates.

Table 4 confirmed that all conditions led to high dephosphorization rates of 85% or more, and all stirring power conditions led to further improved dephosphorization rates along with increases in the proportion of the refining agent 7 in the lime source injected from the injection lance 3.

TABLE 4

| | | Refining agent | | | Component of hot metal (phosphorus concentration) | | |
| --- | --- | --- | --- | --- | --- | --- | --- |
| Conditions | Stirring power [W/t] | Proportion of refining agent in lime source [% by mass] | Specific surface area [$m^2/g$] | Ig-loss [% by mass] | Before treatment [% by mass] | After treatment [% by mass] | Dephosphorization rate [%] |
| Ex. 4-1 | 457 | 50 | 2.73 | 18.0 | 0.123 | 0.018 | 85 |
| Ex. 4-2 | 726 | 50 | 2.73 | 18.0 | 0.124 | 0.016 | 87 |

TABLE 4-continued

| | | Refining agent | | | Component of hot metal (phosphorus concentration) | | |
|---|---|---|---|---|---|---|---|
| Conditions | Stirring power [W/t] | Proportion of refining agent in lime source [% by mass] | Specific surface area [m²/g] | Ig-loss [% by mass] | Before treatment [% by mass] | After treatment [% by mass] | Dephosphorization rate [%] |
| Ex. 4-3 | 457 | 70 | 2.73 | 18.0 | 0.125 | 0.017 | 86 |
| Ex. 4-4 | 726 | 70 | 2.73 | 18.0 | 0.124 | 0.015 | 88 |
| Ex. 4-5 | 457 | 100 | 2.73 | 18.0 | 0.126 | 0.014 | 89 |
| Ex. 4-6 | 726 | 100 | 2.73 | 18.0 | 0.121 | 0.012 | 90 |

REFERENCE SIGNS LIST

1: Hot metal holding container
2: Hot metal
3: Injection lance
4: Top-blowing lance
5: Charging chute
6: Carrier gas
7: Refining agent
8: Slag
9: Gaseous oxygen source
10: Carrier gas
11, 12: Dephosphorizing agent (solid oxygen source))

The invention claimed is:

1. A method for dephosphorizing hot metal, wherein, during performing dephosphorization treatment of the hot metal by adding a refining agent as a lime source and an oxygen source to the hot metal accommodated in a hot metal holding container, the refining agent having an Ig-loss value of from 5.0% by mass to 24.0% by mass and including 60% by mass or more of quick lime and further including one or both of calcium carbonate and calcium hydroxide, wherein the % by mass refers to a total mass of the refining agent,
wherein when adding the refining agent, the refining agent is injected under a bath surface of the hot metal.

2. The method for dephosphorizing hot metal according to claim 1, wherein when adding the refining agent, the refining agent is injected together with a carrier gas through an injection lance immersed under a bath surface of the hot metal under conditions satisfying Formulas (1) to (3):

[Math. 1]

$$300 \leq \varepsilon_g + \varepsilon_P \leq 1000 \quad (1)$$

$$\varepsilon_g = 6.183 \times \frac{Q \times T_1}{W} \times \left( \ln\left(1 + \frac{h}{1.02 \times 10^{-4} \times P}\right) + \left(1 - \frac{T_g}{T_l}\right) \right) \quad (2)$$

$$\varepsilon_P = 2.25 \times 10^{-5} \times m \times \frac{Q^2}{d_0^4 \times W} \quad (3)$$

in which $\varepsilon_g$ represents a carrier gas stirring power [W/t]; $\varepsilon_p$ represents a lime source energy; Q represents a carrier gas flow rate [N m³/min]; W represents a hot metal amount [t]; $T_1$ represents a hot metal temperature [°C]; $T_g$ represents a carrier gas temperature [°C]; h represents an injection lance immersion depth [m]; P represents an atmospheric pressure [Pa]; m represents a lime source injecting rate [g/s]; and do represents an injection lance nozzle diameter [cm].

3. The method for dephosphorizing hot metal according to claim 2, wherein the refining agent has a specific surface area of from 0.5 m²/g to 5 m²/g.

4. The method for dephosphorizing hot metal according to claim 2, wherein the refining agent alone is used as the lime source.

5. The method for dephosphorizing hot metal according to claim 1, wherein the refining agent has a specific surface area of from 0.5 m²/g to 5 m²/g.

6. The method for dephosphorizing hot metal according to claim 5, wherein the refining agent alone is used as the lime source.

7. The method for dephosphorizing hot metal according to claim 1, wherein the refining agent alone is used as the lime source.

8. A refining agent having an Ig-loss value of from 5.0% by mass to 24.0% by mass, including 60% by mass or more of quick lime and further including one or both of calcium carbonate and calcium hydroxide, and used for dephosphorization treatment of hot metal by injection under a bath surface of the hot metal, wherein the % by mass refers to a total mass of the refining agent.

* * * * *